(12) United States Patent
House et al.

(10) Patent No.: US 9,581,044 B2
(45) Date of Patent: Feb. 28, 2017

(54) ROLLING ELEMENT BEARING CARTRIDGE WITH AXIAL THRUST DAMPING AND ANTI-ROTATION ASSEMBLIES

(75) Inventors: Timothy House, Arden, NC (US); Paul Diemer, Arden, NC (US); Michael Bucking, Asheville, NC (US); Mike Harris, Fairview, NC (US); Augustine Cavagnaro, Flat Rock, NC (US)

(73) Assignee: BorgWarner Inc., Auburn Hills, MI (US)

( * ) Notice: Subject to any disclaimer, the term of this patent is extended or adjusted under 35 U.S.C. 154(b) by 821 days.

(21) Appl. No.: 13/879,815

(22) PCT Filed: Oct. 21, 2011

(86) PCT No.: PCT/US2011/057273
§ 371 (c)(1),
(2), (4) Date: Apr. 17, 2013

(87) PCT Pub. No.: WO2012/058111
PCT Pub. Date: May 3, 2012

(65) Prior Publication Data
US 2013/0202432 A1    Aug. 8, 2013

Related U.S. Application Data

(60) Provisional application No. 61/407,552, filed on Oct. 28, 2010.

(51) Int. Cl.
*F16C 33/46*    (2006.01)
*F01D 25/16*    (2006.01)
(Continued)

(52) U.S. Cl.
CPC ........... *F01D 25/162* (2013.01); *F01D 25/16* (2013.01); *F04D 29/059* (2013.01);
(Continued)

(58) Field of Classification Search
CPC ............... F01D 25/166; F05D 2220/40; F05D 2230/64; F05D 2240/53; F05D 2260/36
See application file for complete search history.

(56) References Cited

U.S. PATENT DOCUMENTS 7,753,591 B2 * 7/2010 Petitjean ................. F01D 25/16
384/397
8,857,180 B2 * 10/2014 Begin ................... F01D 25/166
123/41.31

FOREIGN PATENT DOCUMENTS

CN      1890475     1/2007
CN      101146988   3/2008
(Continued)

*Primary Examiner* — Patrick Hamo
(74) *Attorney, Agent, or Firm* — A. Michael Tucker; Stephan A. Pendorf; Patent Central LLC (57) ABSTRACT

To solve both axial and rotational constraint problems in turbochargers with rolling element bearings (REBs), a REB sleeve or outer race is mounted to the bearing housing in a way that is not axially and radially rigid, thus allowing for oil damping films both radially and axially. At the same time, the REB sleeve or outer race is held so that the REB sleeve or outer race does not rotate relative to the bearing housing. This dual purpose is achieved using an anti-rotation ring and a damping ring. The anti-rotation ring includes at least one anti-rotation feature for engaging the bearing housing and at least one anti-rotation feature for engaging the REB cartridge, preventing rotation of the REB cartridge sleeve or outer race. The damping ring axially locates the REB cartridge and dampens axial movement and cushions axial thrust.

7 Claims, 10 Drawing Sheets

(51) Int. Cl.
*F16C 35/067* (2006.01)
*F16C 19/18* (2006.01)
*F16C 27/04* (2006.01)
*F04D 29/051* (2006.01)
*F04D 29/059* (2006.01)
*F04D 29/62* (2006.01)

(52) U.S. Cl.
CPC ....... *F04D 29/0513* (2013.01); *F04D 29/622* (2013.01); *F16C 19/184* (2013.01); *F16C 27/045* (2013.01); *F16C 33/46* (2013.01); *F16C 35/067* (2013.01); *F05D 2220/40* (2013.01); *F05D 2240/70* (2013.01); *F05D 2260/30* (2013.01); *F16C 2360/24* (2013.01)

(56) References Cited

FOREIGN PATENT DOCUMENTS

| | | |
|---|---|---|
| EP | 1705393 | 9/2006 |
| EP | 1905960 | 4/2008 |
| JP | 2007113708 | 5/2007 |
| JP | 2008232179 | 10/2008 |

\* cited by examiner

ROLLING ELEMENT BEARING CARTRIDGE WITH AXIAL THRUST DAMPING AND ANTI-ROTATION ASSEMBLIES

FIELD OF THE INVENTION

This invention is directed to a turbocharger rolling element bearing (REB) cartridge comprised of easily manufactured parts. The REB cartridge is designed to provide anti-rotation of the outer sleeve or race of the REB cartridge relative to the bearing housing, and yet to allow the REB cartridge sufficient freedom of movement so that natural oscillations of the rotating assembly can be dampened circumferentially by an encapsulating oil film or an oil flow under pressure. The REB cartridge is also designed to provide axial constraint, yet allow sufficient freedom to permit damped transfer of axial thrust loads to the bearing housing in either axial direction. The parts of the REB cartridge are designed to ensure ease and correctness of assembly.

BACKGROUND OF THE INVENTION

Turbochargers deliver air, at greater density than would be possible in the normally aspirated configuration, to the engine intake, allowing more fuel to be combusted, thus boosting the engine's horsepower without significantly increasing engine weight. A smaller turbocharged engine can replace a normally aspirated engine of a larger physical size, thus reducing the mass and aerodynamic frontal area of the vehicle.

Turbochargers are a type of forced induction system which uses the exhaust flow entering the turbine housing from the engine exhaust manifold to drive a turbine wheel (51). The turbine wheel is located in the turbine housing and is solidly affixed to a shaft to become the shaft and wheel assembly. A compressor wheel (20) is mounted to the stub shaft (56) end of the shaft and wheel and held in position by the clamp load from a compressor nut (29). The primary function of the turbine wheel is extracting rotational power from the exhaust gas to drive the compressor.

The compressor stage consists of a wheel (20) and its housing. Filtered air is drawn axially into the inlet of the compressor cover by the rotation of the compressor wheel. The power input by the turbine stage to the shaft and wheel drives the compressor wheel to produce a combination of static pressure with some residual kinetic energy and heat. The pressurized gas exits the compressor cover through the compressor discharge and is delivered, usually via an aftercooler, to the engine intake.

In one aspect of compressor stage performance, the efficiency of the compressor stage is influenced by the clearances between the compressor wheel contour (28) and the matching contour in the compressor cover. The closer the compressor wheel contour is to the compressor cover contour, the higher the efficiency of the stage. The closer the wheel is to the cover, the higher the chance of compressor wheel rubs; so, there must exist a compromise between improving efficiency and improving durability.

Figure 1:
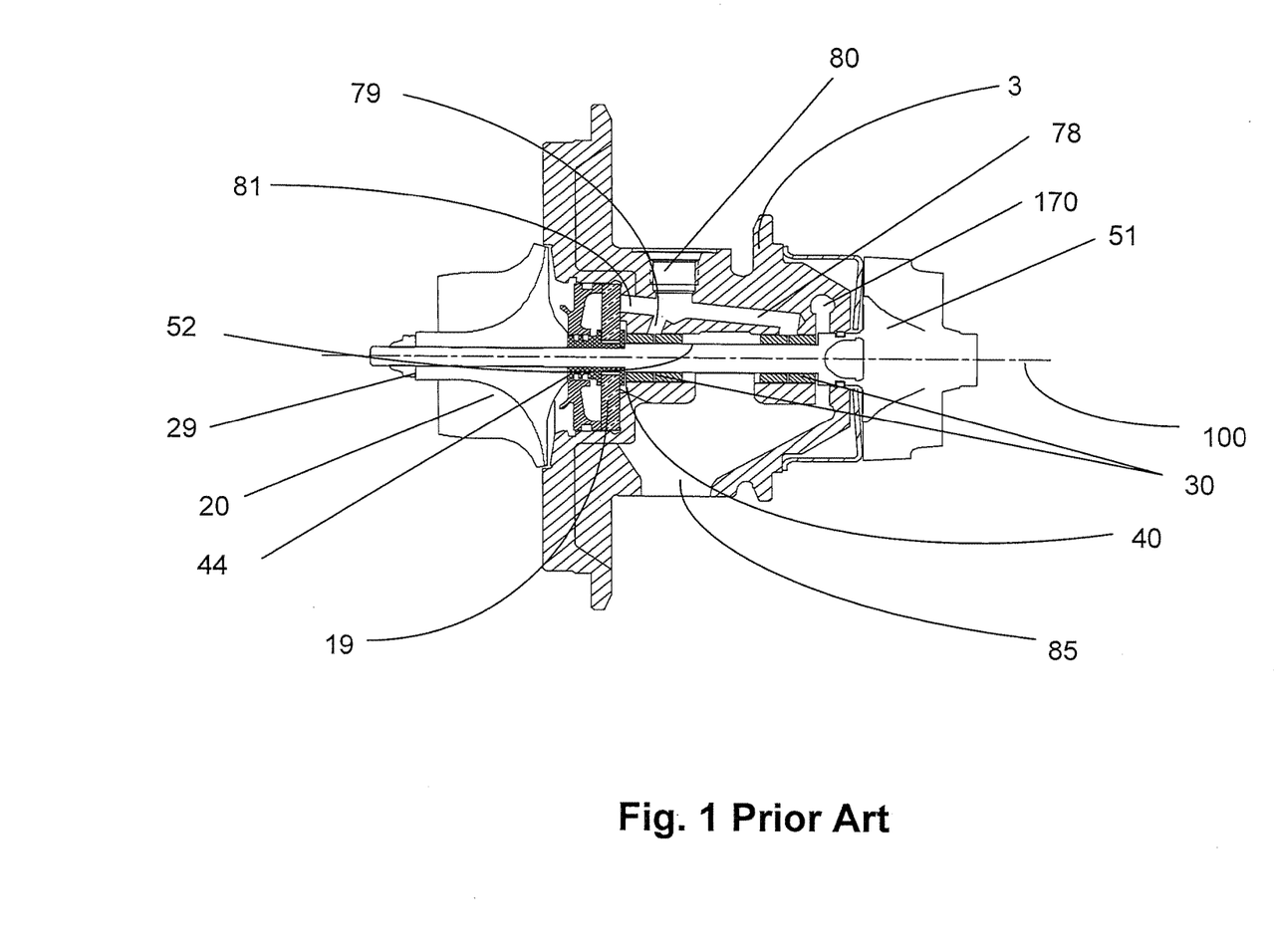
FIG. 1 depicts a sectional view of a turbocharger assembly.

To the naked eye, the nose of the compressor wheel in a typical turbocharger appears to rotate about the geometric longitudinal axis of the bearing housing; however, when viewed as a track on an X, Y-oscilloscope, the nose of the compressor wheel describes orbits of various shapes. The average centroid of the orbits is close to, but not exactly centered on, the geometric longitudinal axis of the turbocharger. The geometric axis (100) is shown in FIG. 1, of the turbocharger.

Both the radial and axial dynamic excursions taken by the shaft and wheels are attributed to a number of factors including: the unbalance of the rotating assembly; the excitation of the pedestal (i.e., the engine and exhaust manifold); net pressure fluctuations in either, or both, the compressor and turbine stages; and the low speed excitation from the vehicle's travel over irregular ground.

The sum effect of these excursions taken by the shaft and wheels is that the typical turbocharger must be designed with clearances far greater than those desired for aerodynamic efficiency levels.

The typical turbocharger is fed with oil from the engine. This oil, at a pressure typically equal to that of the engine, performs several functions. The oil is delivered to both sides of the journal bearings to provide a double hydrodynamic squeeze film, the pressures of which exert reactionary forces of the shaft on the I.D. of the bearing and of the O.D. of the bearing on the bearing housing bore. The oil films provide attenuation of the reactionary forces to reduce the amplitude of the excursions of the shaft. The oil also functions to remove heat from the turbocharger.

A typical turbocharger design has two spaced apart bearing systems: one at the compressor-end of the bearing housing, and one at the turbine-end of the bearing housing. Each system has two interfaces: the interface of the rotating shaft with the I.D. of the floating bearing, and the interface of the O.D. of the floating bearing with the fixed bore of the bearing housing.

The stiffness and damping capacities of the typical turbocharger double hydrodynamic squeeze film bearings are a compromise between: the thickness of the oil film generated by the rotational speed of the bearing elements and the clearance between the elements. FIG. 1 depicts a typical turbocharger with a double hydrodynamic squeeze film bearing configuration. In this configuration, pressurized oil is received to the bearing housing (3) though an oil inlet (80) from the engine. The oil is pressure-fed through the oil galleries (78 and 79) to the bearing housing journal bearing bore. For both the turbine-end and compressor-end bearings (30), the oil flow is delivered to the shaft and wheel journal bearing zones where the oil is distributed around the shaft to generate an oil film between the shaft surface (52) and the inner bore of the floating journal bearings (30). On the outside of the journal bearings (30), a like oil film is generated by the rotation of the journal bearing against the bearing housing journal bearing bore. Once through the journal and thrust bearings, the oil exits the bearing housing via the oil drain (85) at the base of the bearing housing and is returned to the crankcase of the engine.

In the typical turbocharger depicted in FIG. 1, the thrust bearing (19) also is a hydrodynamic or fluid film type of bearing. In this configuration, the stationary thrust bearing is fed oil from the oil gallery (81) to feed a ramp and pad design of the bearing. The oil is driven into a wedge shape by the relative motion of the thrust washer (40) and the opposing face of the flinger (44), which is mounted to the shaft, against the static thrust ramp and pad. This bearing controls the axial position of the rotating assembly.

One method for increasing the efficiency of the turbocharger is the adoption of rolling element bearings (REBs) to support the rotating assembly. Rolling element bearings can be divided into two general types. The first type uses a pair of typical REB assemblies. Each REB assembly, in this case, consists of an outer race, the balls or roller elements, an inner race, cage, and seals. This pair of REB assemblies can be pressed or shrunk into a sleeve, i.e. an outer cylindrical housing with oil galleries and locations for the REB assemblies, to produce an REB cartridge. In the second type, the sleeve is omitted. A single outer race is used, with two tracks defined therein. The metal (or ceramic) surrounding the single outer race defines the outer diameter of the REB cartridge. The outer race and has received therein at least two inner race(s) which are in contact with the shaft of the turbocharger. Unless otherwise indicated, the term "race" shall refer to the metal (or ceramic) element with one or more tracks contacted by the rolling elements, and the term "REB" used herein will encompass both types of REB cartridge.

Figure 2:
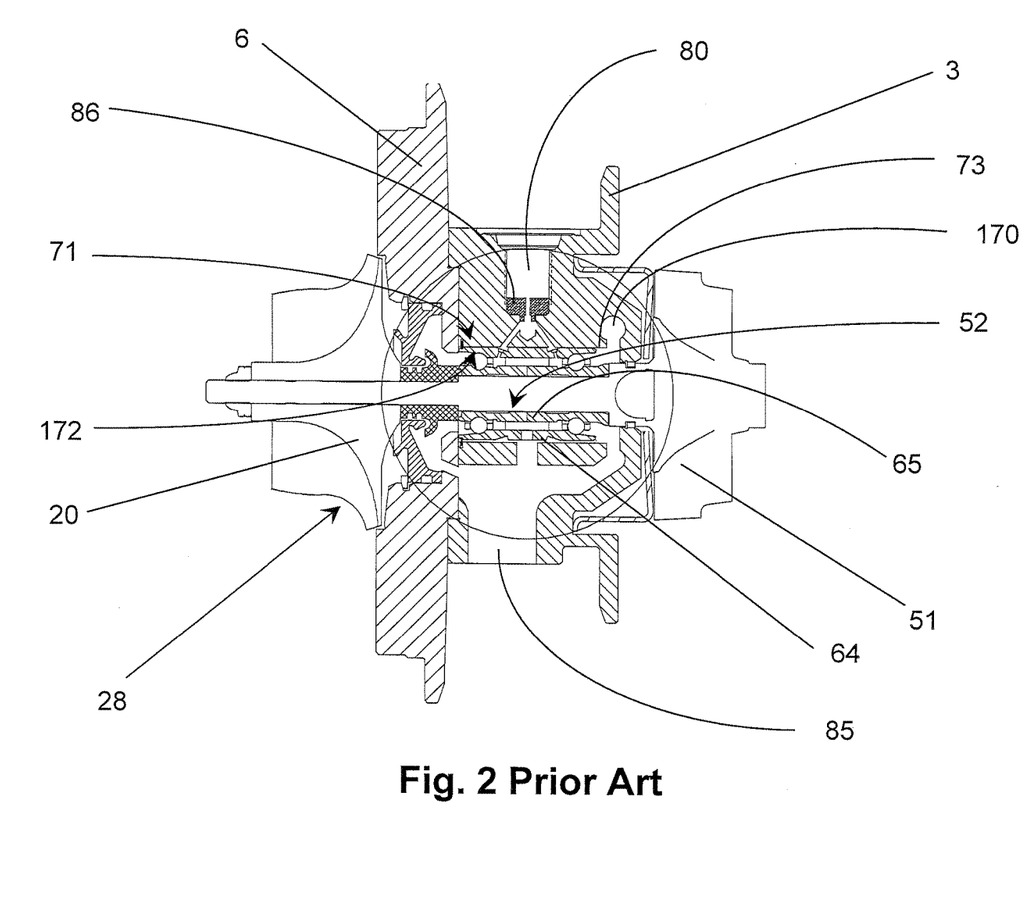
FIG. 2 depicts a section of a typical ball bearing turbocharger bearing housing assembly.
Figure 6A:
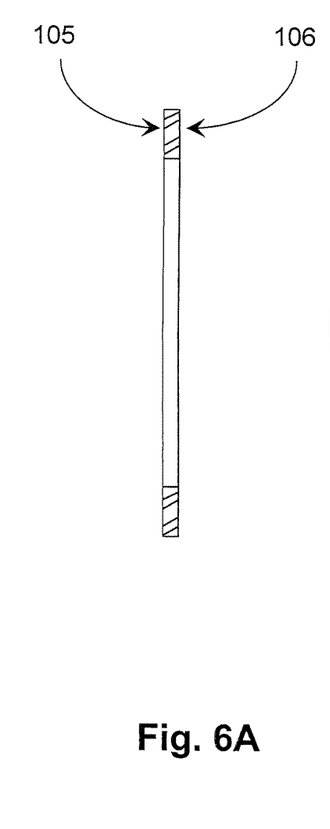
FIGS. 6A, B depict views of the damping ring.
Figure 6B:
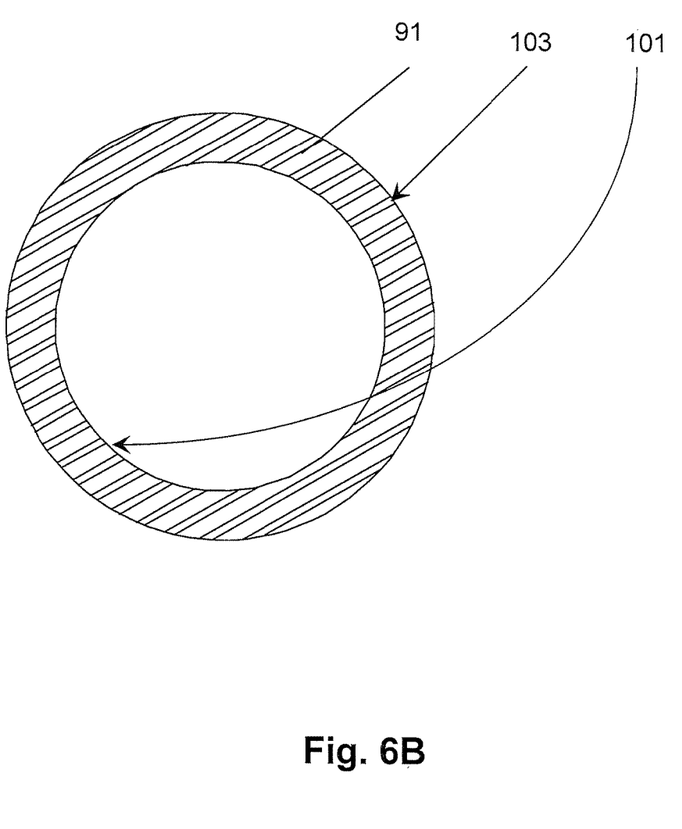
Figure 7A:
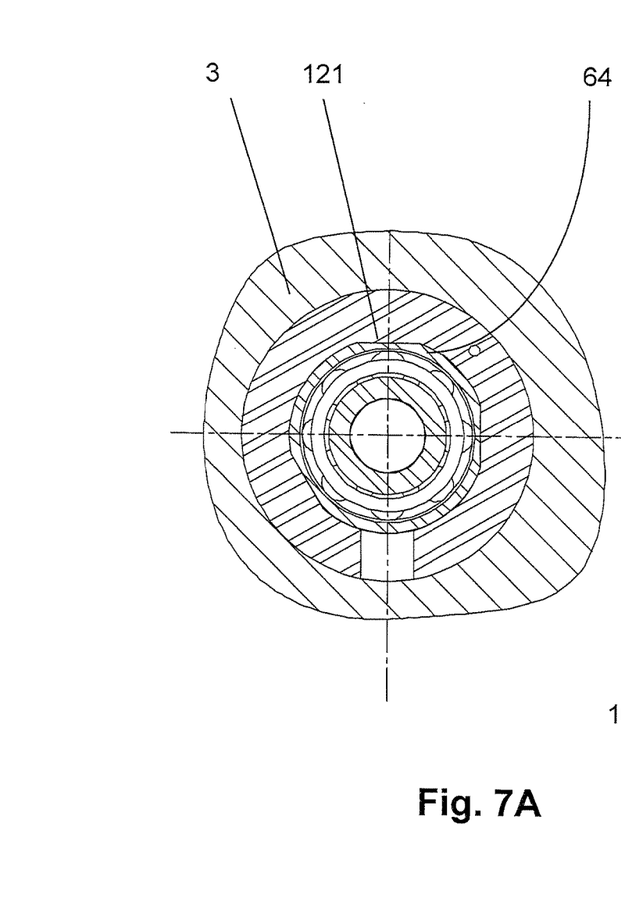
FIGS. 7A, B depict section views of the anti-rotation ring assembled to a bearing housing.
Figure 7B:
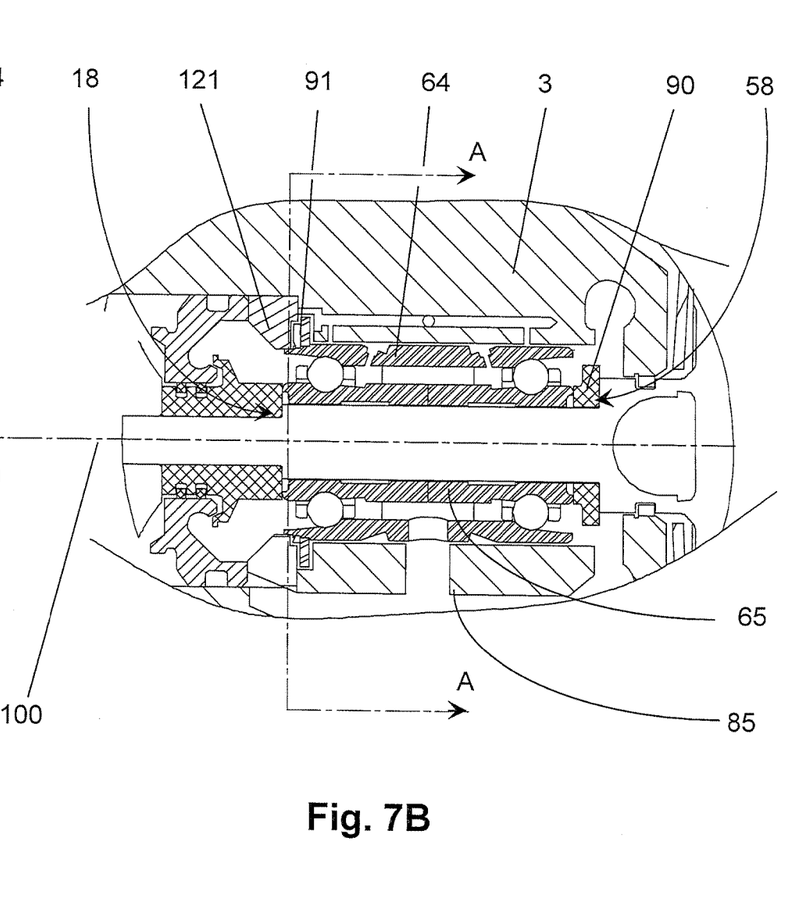
Figure 8A:
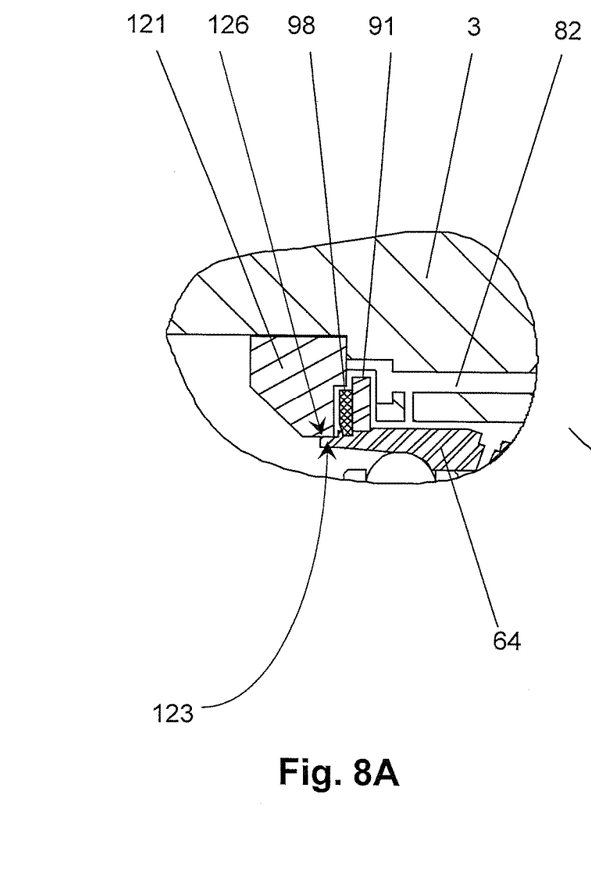
FIGS. 8A, B depict further magnified views of FIGS. 7A, 7B.
Figure 8B:
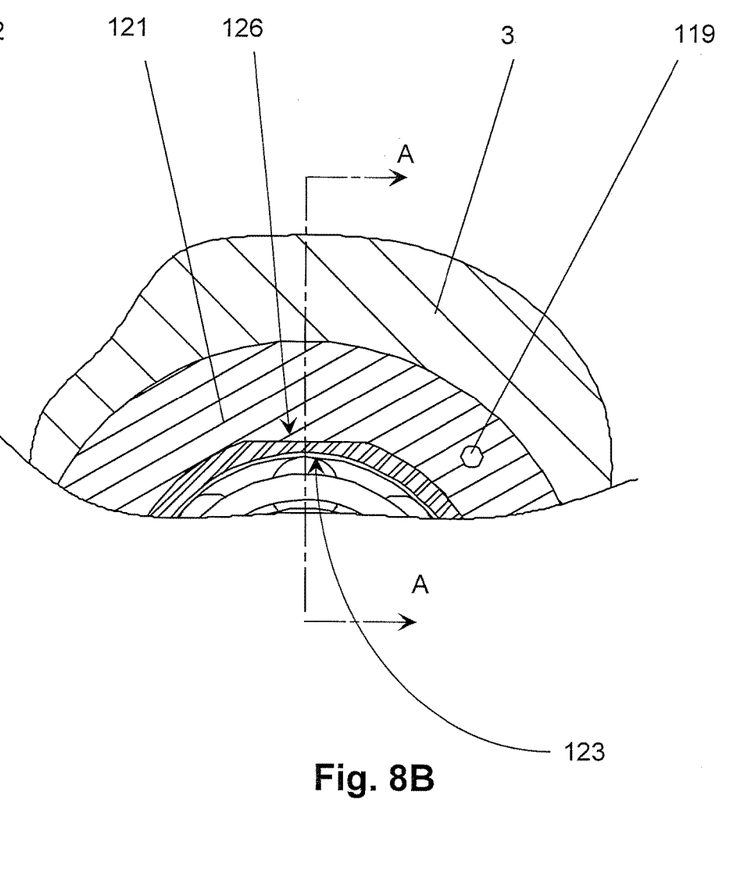
Figure 9A:
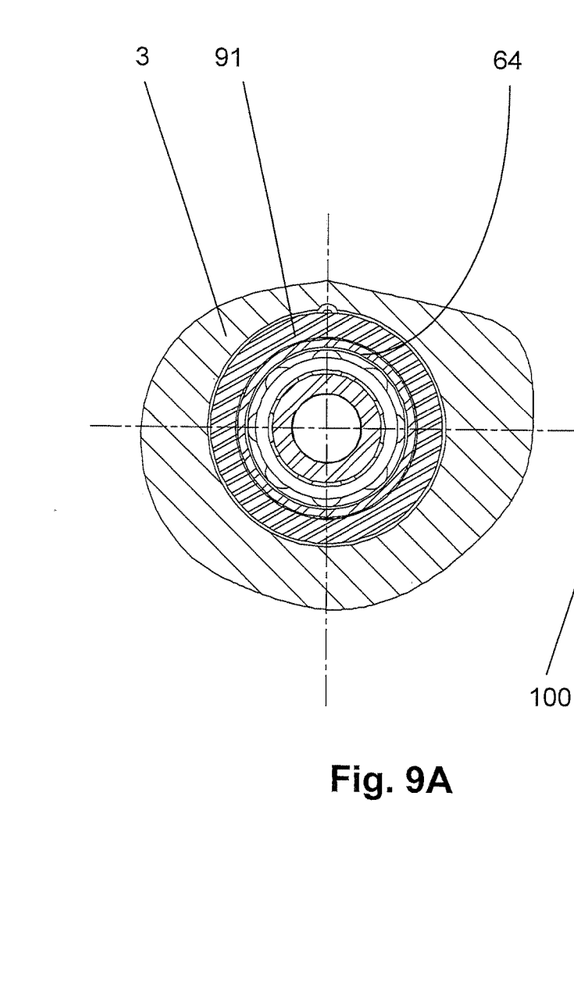
FIGS. 9A, B depict section views of the damping ring assembled to a bearing housing.
Figure 9B:
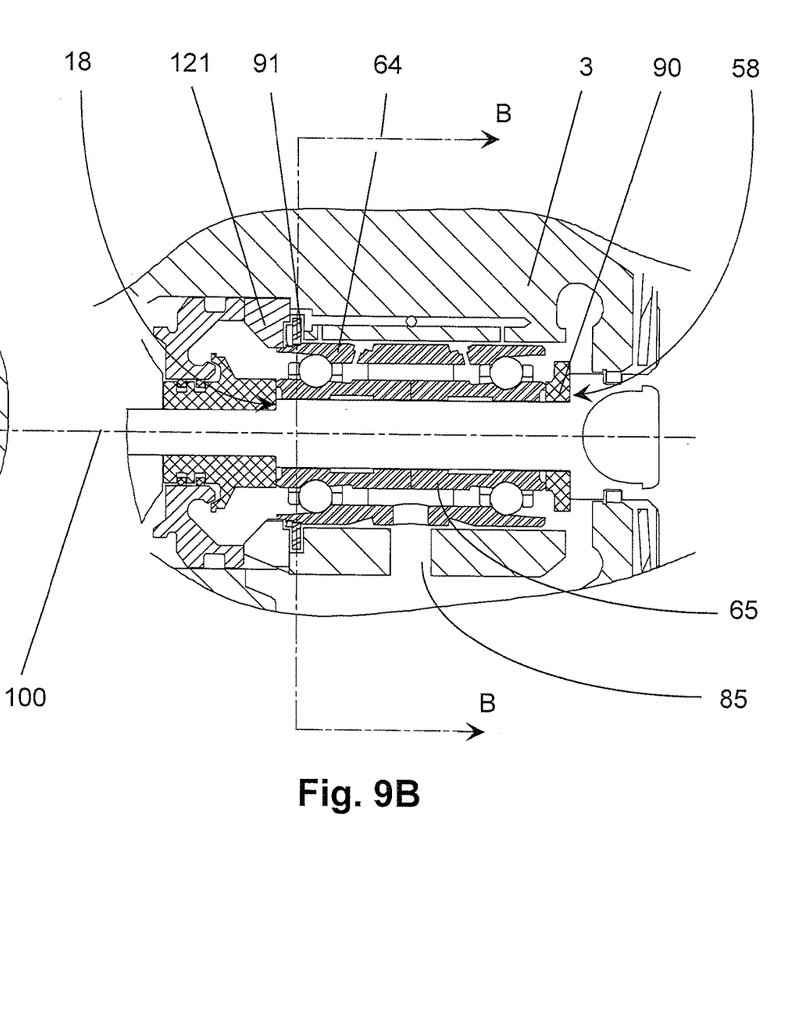
Figure 10A:
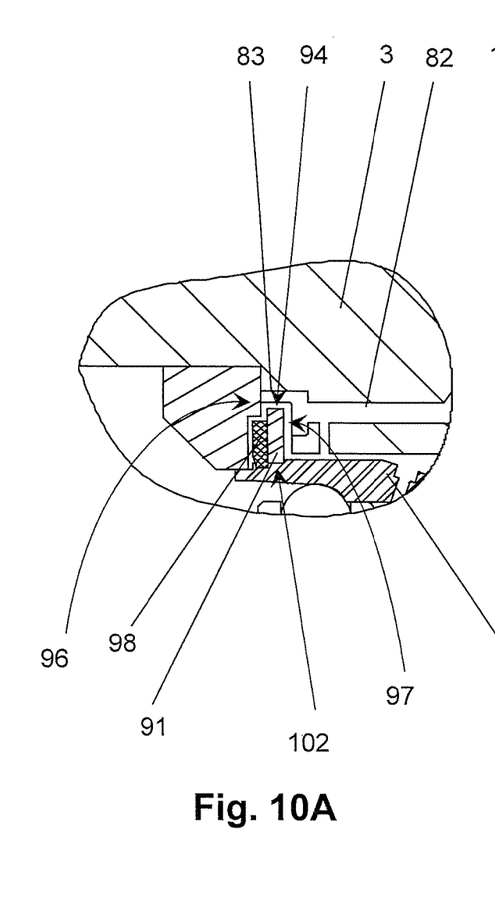
FIGS. 10A, 10B depict further magnified views of FIGS. 9A, 9B.
Figure 10B:
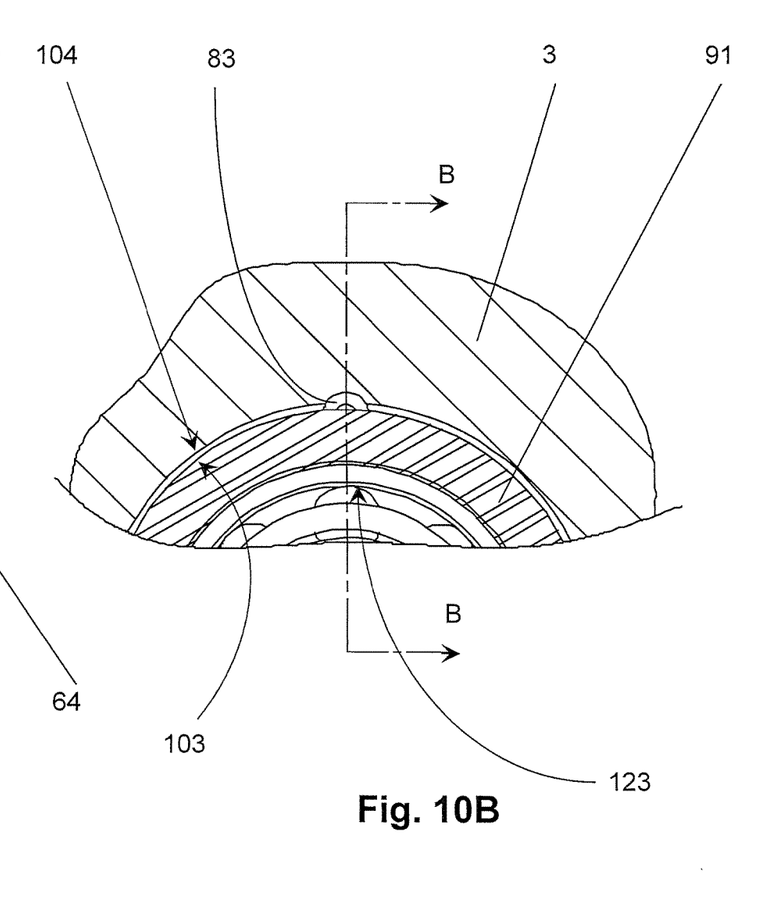

As seen in FIG. 2, REBs typically have an inner race (65), or races, which are mounted to the shaft and wheel journal surface (52). Assembled to the inner race or races (65, 65C and 65T), are a set of rolling elements which roll in tracks formed in both the inner race and the outer race (64) (FIG. 6). The outer race is mounted within the bore (71) in the bearing housing (3). Since rolling element bearings do not require as much oil as do typical turbocharger journal bearings, an oil restrictor/post (86) is fitted to the oil inlet (80) to restrict the flow to the REBs.

There are several improvements that come with the adoption of rolling element bearing turbochargers. There is an improvement in transient response due to the reduction in power losses, especially at low turbocharger RPM, of the REB system over the typical turbocharger bearing system. The power losses in REB systems are less than those for typical hydrodynamic sleeve type turbocharger bearing systems. REB systems can support much greater thrust loads than can typical turbocharger bearing systems, making the thrust component more robust.

While REB systems provide these efficiency and transient performance gains, the damping capacity of REBs is not as good as that of the typical turbocharger double hydrodynamic squeeze film bearings. For ease of assembly, the bearings are retained in a REB cartridge or outer race, which is suspended within the bearing housing by an oil film between the O.D. of the cartridge (172) and the I.D. of the bearing housing bore (71). The oil is used for damping of shaft critical events and for lubrication of the bearings. With this design, it is critical that the bearing cartridge is not in a metal-to-metal contact with the bearing housing bore as the damping function will be lost.

Figure 3:
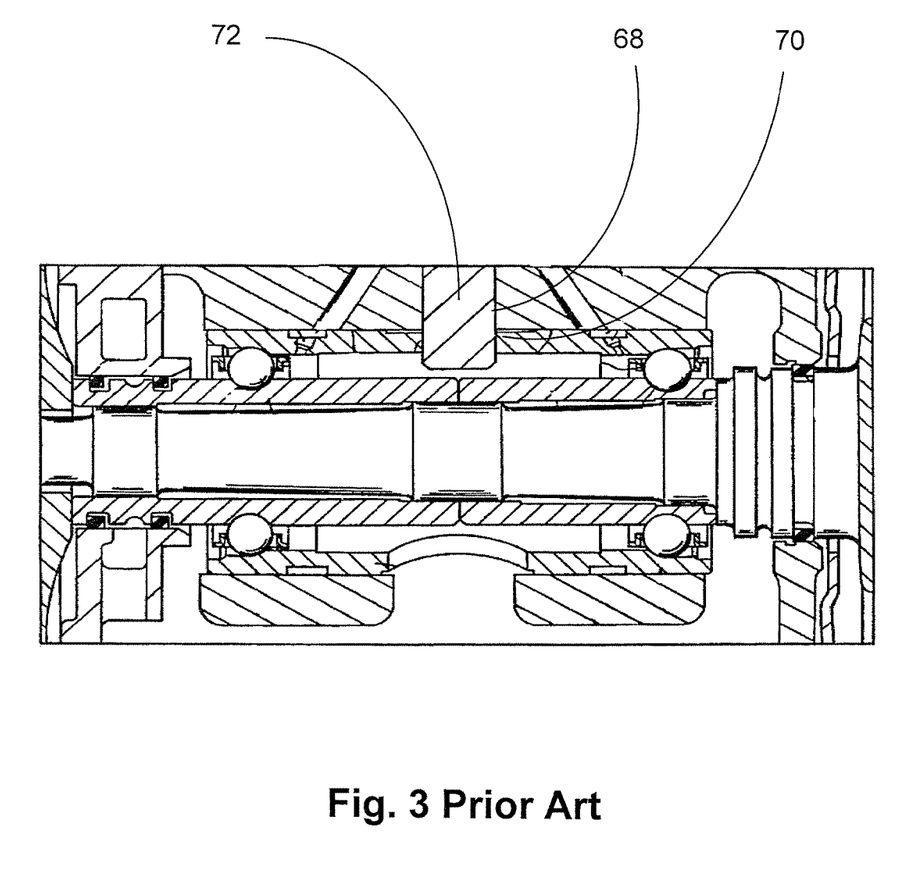
FIG. 3 depicts a prior art roller bearing.
Figure 4:
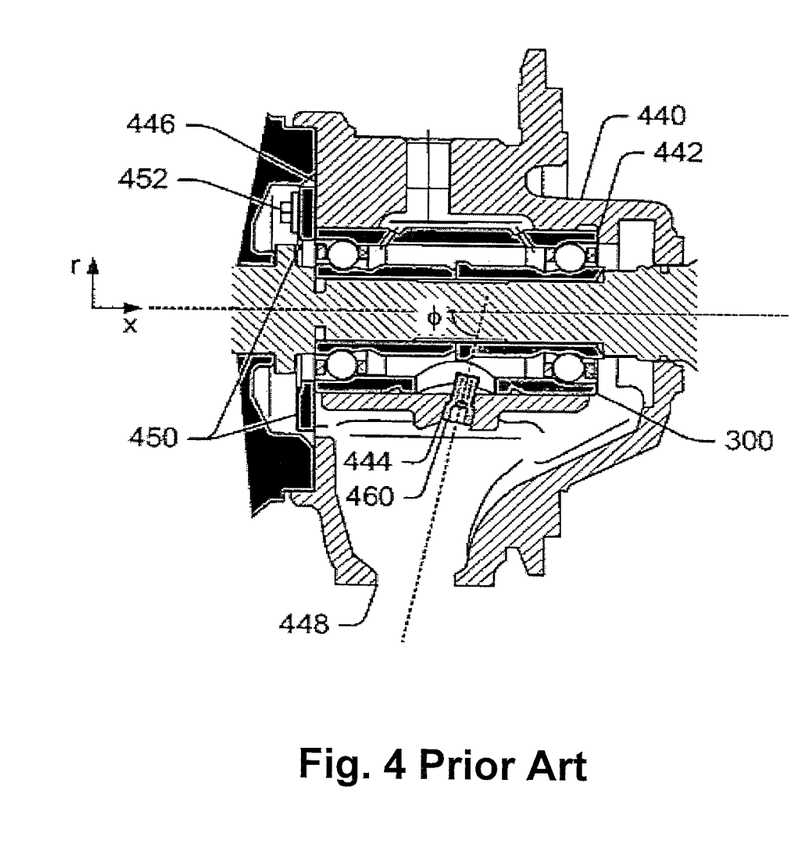
FIG. 4 depicts another prior art roller bearing.

U.S. Pat. No. 5,145,334 (Gutknecht) and U.S. Pat. No. 7,214,037 (Mavrosakis) teach methods for the retention of a floating bearing cartridge in a bearing housing. A post secured in the bearing housing (e.g., FIG. 2 restrictor (86)) restrains the bearing cartridge such that the post reacts against the axial and rotational forces, while allowing for otherwise unconstrained motion (float) of the bearing cartridge in the bearing housing. In U.S. Pat. No. 7,214,037, as shown in FIG. 4, a pin (460) received by an opening (444) of the housing (440) optionally aids in locating the cartridge azimuthally with respect to the housing (440). A pin (72) similar to that of U.S. Pat. No. 5,145,334 is shown in FIG. 3 of the present application, locating a bore (68) in the cartridge and a bore (70) in the outer race to provide both axial and rotational constraint relative to the bearing housing. Both of these methods require machining through orifices in the bearing housing, and, furthermore, they require intricate assembly in an area not well-visible to the assembler, making both correct assembly and verification of the assembly of said pins difficult.

U.S. Pat. No. 7,214,037 teaches the use of a counter-bore (442, FIG. 4) and a plate (450) to control the axial loads exerted on the outer race of the bearing cartridge. The machining of this counter-bore requires accurate placement of the cutting tool, which must change direction from cutting a diametral surface to an abutment surface deep inside the bearing housing, without leaving too great an inclusive corner radius, which might not allow the bearing cartridge to seat on the abutment. The execution of this process adds cost and complexity to the machining of the bearing housing.

While there are problems associated with the conventional methods for constraint of the sleeve or outer race of a ball bearing cartridge REB against rotation relative to the bearing housing in which it mounts, the omission of axial and rotational constraint would allow the compressor and turbine wheels of the rotating assembly to contact the housings and would allow the cartridge sleeve or outer race to rotate freely in the bearing housing, each of which would shorten the life of the turbocharger. The inventors saw the need for means for constraining a cartridge which fulfilled both the needs for (a) rotational constraint of the REB cartridge sleeve or outer race relative to the bearing housing, without affecting the radial damping function of the REB, and (b) damped constraint of the REB cartridge in both the radial and axial directions.

So it can be seen that the current state of axial and rotational constraint of the REB cartridge is both costly and complex. A more cost and technically effective solution is needed. An improved configuration should comply with the need for the parts to be easily seen for visual inspection by the assembly personnel to ensure that said devices were actually installed in the completed turbocharger assembly.

There exists a need to solve the above problems of mounting the REB cartridge or outer race, in a manner which allowed for radial and axial damping by an encapsulating oil film (which may be static or dynamic), while, at the same time, allowing the REB cartridge to be constrained axially, to transfer the axial loads to the bearing housing, and constrained rotationally, so that the REB sleeve or outer race does not rotate relative to the bearing housing. There is thus a need for a cost-effective, simple to assemble, anti-rotation feature and axially damping feature, utilizing a damping oil film both around the REB sleeve or outer race, around the axial constraint feature, yet preventing the REB outer race or sleeve from rotating relative to the bearing housing.

SUMMARY OF THE INVENTION

The inventors solved the problems by developing a turbocharger including a rolling element bearing (REB) cartridge supported in a bearing bore in the bearing housing, the REB cartridge comprising at least one inner race, at least one outer race, and a series of rolling elements, each rolling element in contact with a track in an inner race and a track in an outer race, and optionally an outer sleeve in frictional contact with the at least one outer race. An anti-rotation ring and a damping ring are provided. The anti-rotation ring includes at least one anti-rotation feature for engaging the bearing housing and at least one anti-rotation feature for engaging the REB cartridge, preventing rotation of the REB cartridge sleeve or outer race. The damping ring axially locates the REB cartridge, dampens axial movement and cushions axial thrust.

The axial and radial constraint system provides both radial and axial damping. The system also provides a simple, assembly-foolproof, low cost, easy to machine, damped anti-rotation feature, allowing damping oil film flow around the REB cartridge or outer race, if needed, yet preventing the outer race or sleeve of a bearing cartridge of a rolling element bearing assembly from rotating relative to the bearing housing.

BRIEF DESCRIPTION OF THE DRAWINGS

The present invention is illustrated by way of example and not by limitation in the accompanying drawings in which like reference numbers indicate similar parts and in which.

DETAILED DESCRIPTION OF THE INVENTION

To solve both axial and rotational constraint problems in turbochargers with rolling element bearings (REBs), a REB sleeve or outer race is mounted to the bearing housing in a way that is not axially or radially rigid, thus allowing for oil damping films both radially and axially. At the same time, the REB sleeve or outer race is held so that the REB sleeve or outer race does not rotate relative to the bearing housing. This dual purpose is achieved using an anti-rotation ring and a damping ring, wherein the anti-rotation ring includes at least one anti-rotation feature for engaging the bearing housing and at least one anti-rotation feature for engaging the REB cartridge, preventing rotation of the REB cartridge sleeve or outer race, and wherein the damping ring axially locates the REB cartridge and dampens axial movement and cushions axial thrust, as well as thrust loads and reversals.

For rotational constraint, the inventors designed an interface between the REB cartridge sleeve or outer race and the bearing housing which allowed ease of machining of the bore in the bearing housing and ease of assembly of the parts, yet provided an anti-rotation feature which still allowed axial and radial damping.

In accordance with the invention, the turbine-end axial abutment (73), shown in FIG. 2, which was a feature of conventional restraining, is no longer required, allowing the bearing housing bore (71) to be machined with constant diameter where it opens out into the oil flinger cavity (170). While this may seem only a slight modification, it represents, in fact, a substantial improvement in manufacturability. Elimination of the turbine-end axial abutment (73) allows the bearing housing bore to be honed to improve the surface finish and enables more accurate dimensions whereas, with an abutment present, the process of honing a cylindrical surface in a blind hole is quite difficult.

The anti-rotation part of the two-part constraint system, as shown in FIGS. 5A, 7A, 7B, 8A, and 8B has an inner circumferential surface and an outer circumferential surface.

Figure 5A:
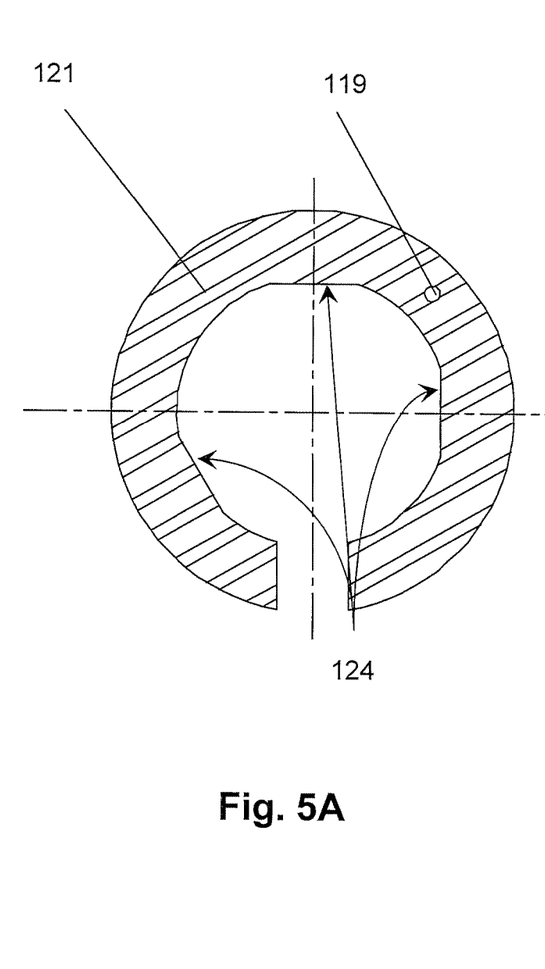
FIGS. 5A, B depict views of the anti-rotation ring.

The anti-rotation ring (121) has one or more non-round, e.g., flat sections (124), or shapes for generally providing rotational constraint between the REB cartridge and the anti-rotation ring, fabricated into the otherwise generally round or circular inside surface of the anti-rotation ring (121), such that, when assembled to the REB cartridge or outer race (64), the flat sections (124), in the anti-rotation ring (121), fit to the corresponding flat sections (126), fabricated into the REB cartridge or outer race (64). The non-round sections are of course not limited to the illustrated flat shape. The term "non-round" refers to any part of the circumference that is not part of a single circle. An arc with the same center but different radius would be "non-round". An arc with the same radius but a different center would be "non-round" as the term is used herein. Alternatively, the anti-rotation features could be round but simply off-center.

The generally cylindrical outer surface of the anti-rotation ring (121) discussed above fits to a mating counterbore in the compressor end of the bearing housing. In one mode of the first embodiment of the invention, rotation of the anti-rotation ring (121), relative to the bearing housing (3), is resisted by a pin located in a bore (119) in the anti-rotation ring and a corresponding bore in the bearing housing (3). The rotational constraint due to the pin provides a unique alignment such that the oil drain in the REB cartridge communicates with an oil drain bore (85) in the bearing housing. This rotationally arresting arrangement of the anti-rotation ring to the bearing housing and rotationally arresting arrangement of the REB cartridge sleeve or outer race to the anti-rotation ring thus constrains the REB cartridge sleeve or outer race from rotating relative to the bearing housing.

Figure 5B:
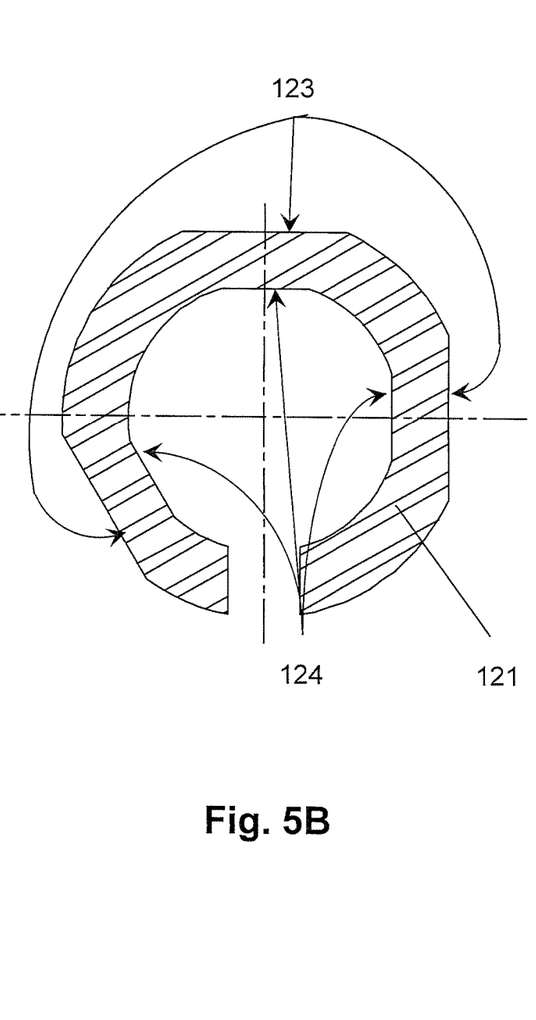

In a first variation to this part of the invention, the details of the rotationally arresting features between the REB cartridge sleeve or outer race (64) to the anti-rotation ring (121) are as in the first part of the invention. As depicted in FIG. 5B, in a variation to this part of the invention, a circumferentially generally cylindrical outer surface of the anti-rotation ring (121) is interrupted by three flat surfaces (123). The term "generally cylindrical outer surface" as used herein with reference to the REB cartridge or anti-rotation ring means that the surface around the outer circumference does not form a single circle, and could be part or all non-cylindrical, e.g., octagonal. There could be any number greater than one flat surface, and the non-round surface could be freely selected and need not be flat, and preferably interlocks with the same number of correspondingly shaped surfaces in the REB cartridge sleeve or outer race, such that, when assembled to the bearing housing (3), the flat sections (123) in the anti-rotation ring (121) fit to corresponding flat sections fabricated into the bearing housing (3) to both provide the rotational constraint and a unique angular alignment so that the oil drain in the REB cartridge communicates with an oil drain bore (85) in the bearing housing.

In a second variation to this part of the invention, the rotationally arresting details of the anti-rotation ring to the REB cartridge sleeve or outer race are the same, but instead of the rotational constraint being a pin or a series of matching flats between the anti-rotational ring and the bearing housing, the anti-rotational elements between anti-rotation ring and REB cartridge sleeve or outer race are fabricated onto the bearing housing closure (6). Since the bearing housing closure has a unique orientation to the bearing housing, then, the unique orientation of the REB cartridge sleeve or outer race, to the bearing housing, is maintained.

To achieve the desired turbocharger aerodynamic performance, the aerodynamics of both turbine and compressor wheels must align with the appropriate aerodynamic features in their respective housings.

The axial alignment of the critical aerodynamic features of both wheels, relative to both housings, is typically controlled by: the position of the REB inner race (65) relative to the ring boss shoulder (58); the axial position of the REB cartridge sleeve or outer race relative to the bearing housing, which is set by the position of the damping ring faces (105,106) and their positions relative to the mating surfaces (96, 97) on the bearing housing and anti-rotation ring (the latter set of constraints being both damped and constrained by the oil film contained between them).

For the purpose of this explanation, the axial position of the REB inner race relative to the REB outer race is assumed fixed as the internal tolerances of the REB assembly are very tight. The relative position control of the turbine housing to bearing housing, and the compressor cover to bearing housing, are for the purpose of this discussion also considered to be fixed.

In the axial damping part of the invention, a damping ring component of the invention is a ring (91) which mounts to the REB cartridge sleeve or outer race, and is axially constrained by a retaining ring (98) so that, in the axial direction, the damping ring moves as one with the REB cartridge. When assembled into the turbocharger, the faces of the damping ring are in close proximity to, albeit separated by a hydraulic film, their mating faces in the bearing housing, closure to the bearing housing or anti-rotation ring. As illustrated, the damping ring may be flat like a washer, but in alternative embodiments of the invention the axially thrusting faces of the damping ring may be conical or spherical or any other shape to modify the damping characteristics.

In one preferred mode of the damping part of the invention, as depicted in FIGS. 6A, 6B, 9A, 9B, 10A, and 10B, the inner generally cylindrical surface (101) of the damping ring (91) is located radially on an outer generally cylindrical surface (102) of the REB cartridge sleeve or outer race (64). The damping ring is constrained axially by, on the one hand, a retaining ring (98), preferably a beveled external (i.e., compressor side) retaining ring which locates in a groove fabricated into the generally cylindrical outer surface (102) of the REB cartridge sleeve or outer race (64) and, on the other hand, an abutment. The damping ring could also he constrained axially by two retaining rings. The damping ring, in this embodiment, is simply a ring with compressor-side (105) and turbine-side (106), usually flat, axial, or "cheek" faces, assembled such that they are perpendicular to the turbocharger centerline. When assembled, the side facing the turbine end (106) of the damping ring is in close proximity to a side facing the compressor end (97) in the bearing housing. The compressor side face (105) of the damping ring is in close proximity to a turbine side face (96) in the anti-rotating ring. The two pairs of faces are separated by an oil film which serves as a damping medium. With axial thrust from the REB cartridge in the direction of the turbine, the turbine-side cheek face (106) of the damping ring exerts force on the oil film on the compressor-side face (97) of the bearing housing. The pressure generated by the aforementioned force in the direction of the turbine wheel is damped by the oil film, while the REB cartridge is constrained in position by the local oil pressure.

Similarly with axial thrust from the REB cartridge sleeve or outer race in the direction of the compressor, the compressor-side cheek face (105) of the damping ring exerts a force on the oil film on the turbine-side face (96) of the anti-rotation ring (121). The pressure generated by this force bears on the turbine-side face (106) of the anti-rotation ring (121). The pressure generated by the aforementioned force in the direction of the compressor wheel is damped by the oil film, while the REB cartridge is constrained in position by the local oil pressure.

The degree of damping required can be adjusted by several methods. The relative surface area of the pairs (turbine side or compressor side) of damping faces can be adjusted by fabricating a smaller or larger diameter ring, or by fabricating holes or indentations in the faces (105, 106) of the damping ring. The degree of damping can also be adjusted by altering the shape of the thrust surfaces to non-planar surfaces as discussed above.

The cavity for the damping ring is defined by the volume enclosed by the REB cartridge (64); the outer, generally cylindrical counterbore (94) in the bearing housing; and the two axially constraining faces (96, 97), which are co-joined by the outer generally cylindrical surface (103) of the damping ring, in the anti-rotation ring and bearing housing. Oil is fed to the damping ring cavity via an oil feed gallery (82), into a counterbore (83), and thence to the active damping ring cavity.

In a variation to the damping part of the invention, the configuration of the damping ring and the relationship between the cheek faces (105,106) and their corresponding reaction faces (96, 97) remain the same, but the interface between the damping ring and the cavity, in which it resides, is located at the turbine end of the REB cartridge sleeve or outer race. Similarly, the interface between the damping ring and the cavity, in which it resides, could be located at any axial position along the REB cartridge sleeve or outer race.

To assemble the REB cartridge, damping ring, and anti-rotation ring, as discussed above: the damping ring (91) is assembled to the REB cartridge sleeve or outer race with a snap ring or retaining ring (98); a thermal spacer (90) is placed on the turbine end of the inner race; and the assembly is slid into the bore in the bearing housing. The shaft and wheel is passed through the thermal spacer; through the inner race(s), against a tool pressed against the compressor end of the inner race. Once the thermal spacer and inner races are pressed against the piston ring boss shoulder (58) of the shaft and wheel, the anti-rotation ring is assembled to both the anti-rotation feature(s) on the REB cartridge sleeve or outer race and the bearing housing. The remainder of the turbocharger is assembled as normal.

In a first embodiment of the invention, the design of the anti-rotation assembly, or its variations, cooperates with the design of the damping assembly, or its variations, to provide a rotational constraint while supporting an axial and radial damping system for the REB cartridge to the bearing housing.

In a second embodiment of the invention, the design of the anti-rotation assembly, or its variations, is used to provide rotational constraint between the REB cartridge sleeve or outer race and the bearing housing.

In a third embodiment of the invention, the design of the anti-rotation assembly, or its variations, is used to impart axial damping between the REB cartridge sleeve or outer race to the bearing housing.

In the same way that the objects of the invention were accomplished using a non-round anti-rotation fit, the objects can also be achieved using a circular or semi-circular, but non-concentric (non-coaxial), anti-rotation fit. A circular shape (recess or projection) is easy to manufacture. Non-concentricity (offset from the axis of rotation of the inner race) ensures proper orientation of the REB sleeve or outer race relative to the bearing housing as well as anti-rotation.

In one embodiment the anti-rotation surface at one end of the REB sleeve or outer race (64) is cylindrical about it's entire circumference (with a diameter the same as, smaller than, or larger than, the REB cartridge), with this cylindrical outer surface is defiled by an axis that is offset from the axis of rotation of the inner race. Such a non-concentric outer surface of the REB cartridge, in contact with a corresponding inner surface of an anti-rotation ring mounted offset from the axis of the inner race, is uniquely oriented as well as secured against rotation.

In another embodiment, the inner surface of the anti-rotation ring is a full cylinder, but only a part of the outer circumference of one end of the REB cartridge (e.g., 90°, 120° or 180°) has an arc shaped anti-rotation contact surface that is defined by an axis that is offset from the axis of rotation of the inner race. For example, the inner surface of the anti-rotation ring may be cylindrical and have a diameter that is the same as the diameter of the REB outer surface. This anti-rotation ring is mounted to the bearing housing such that the center axis of the inner surface of the anti-rotation ring is 1 mm lower than the axis of rotation of the inner race. In order for the REB to engage this inner surface of the anti-rotation ring, it is necessary to machine away a crescent from the top of the REB cartridge such that the top surface (e.g., 90°, 120° or 180°) is defined by the same diameter as the inner surface of the anti-rotation ring and with a center axis 1 mm lower than the axis of rotation of the inner race. So long as the circular internal diameter of the anti-rotation ring is offset from the axis of rotation of the inner race, and so long as at least a segment of the outer diameter of one end of the REB is contoured to match, this internal diameter of the anti-rotation ring, then the REB outer race or sleeve will be held secured against rotation and with proper orientation by the anti-rotation ring. For anti-rotation, it is sufficient that the circle, or at least arc, of the contacting surfaces of the REB outer race or sleeve and the anti-rotation ring has a center or axis sufficiently offset from the axis of rotation of the inner race, that the offset contact between anti-rotation ring and REB outer race or sleeve secure the REB outer race or sleeve against rotation.

So it can be seen that in any of the embodiments of the invention, a simple, cost-effective, design achieves the desired, positional control of the REB cartridge sleeve or outer race, with either damping, rotational constraint, or both damping and rotational constraint.

One particular embodiment of the invention comprises a turbocharger including: a shaft having a rotation axis, a compressor end and a turbine end; a bearing housing (3) including a bearing bore and having a compressor side and a turbine side; a rolling element bearing (REB) cartridge supported in said bearing bore, the REB cartridge comprising at least one outer race (64) and at least one inner race (65) mounted for rotation about a rotation axis within said outer race by means of a series of rolling elements, each rolling element in contact with a track in an inner race and a track in an outer race, and optionally an outer sleeve in frictional contact with the at least one outer race (64); an anti-rotation ring having a cylindrical inner surface and mounted against rotation in the turbocharger such that the axis of the cylindrical inner surface of the anti-rotation ring is offset from the axis of rotation of the at least one inner race, wherein one end of the REB cartridge has an outer surface secured against rotation by contact with said inner surface of said anti-rotation ring.

Now that the invention has been described, what is claimed is:

1. A turbocharger including: a shaft having a compressor end and a turbine end;
    a bearing housing (3) including a bearing bore and having a compressor side and a turbine side;
    a rolling element bearing (REB) cartridge supported in said bearing bore, the REB cartridge comprising at least one inner race (65), at least one outer race (64), and a series of rolling elements, each rolling element in contact with a track in an inner race and a track in an outer race, and an outer sleeve in frictional contact with the outer race (64); and
    a damping ring (91) seated on said outer race or outer sleeve, axially fixed, with axial faces in such proximity to adjacent axial faces of structures enclosing the damping ring such that provision of oil between said axial faces constrains the REB cartridge axially and dampens axial movement.

2. The turbocharger of claim 1, wherein said damping ring (91) is axially located between an abutment and a retaining ring (98), or between two retaining rings.

3. The turbocharger of claim 1, wherein said damping ring (91) is a damping flange incorporated into the outer race of the bearing cartridge.

4. The turbocharger of claim 1, wherein at least one axial thrust surface of said damping ring (91) is non-planar.

5. The turbocharger of claim 1, wherein at least one axial thrust surface of said damping ring (91) is free to rotate relative to said REB outer sleeve or outer race.

6. The turbocharger as in claim 1, wherein the damping ring (91) is seated on the compressor end, the turbine end, or centrally on the sleeve or outer race.

7. A turbocharger including: a shaft having a compressor end and a turbine end; a bearing housing (3) including a bearing bore and having a compressor side and a turbine side;
    a rolling element bearing (REB) cartridge supported in said bearing bore, the REB cartridge comprising at least one inner race (65), at least one outer race (64), and a series of rolling elements, each rolling element in contact with a track in an inner race and a track in an outer race, and an outer sleeve;
    an anti-rotation ring (121) having an outer surface and a non-round generally cylindrical inner surface, the inner surface having one or more sections (124) deviating from a circle with constant radius about the shaft axis;
    and wherein the REB outer race or sleeve has a compressor end and a turbine end, and having a radially extending continuous outer circumference of at least one end containing at least one non-round outer surface section formed as a part of the radially extending continuous outer circumference and adapted for receiving the non-round section of the anti-rotation ring and securing the REB outer race or sleeve against rotation relative to the anti-rotation ring, and a damping ring (91) seated on said outer race or outer sleeve, axially fixed, with axial faces in such proximity to adjacent axial faces of structures enclosing the damping ring such that provision of oil between said axial faces constrains the REB cartridge axially and dampens axial movement.

* * * * *